United States Patent
Detterbeck et al.

[15] 3,636,937
[45] Jan. 25, 1972

[54] BAKING AND ROASTING OVEN

[72] Inventors: Heinrich Detterbeck; Heinrich Kaehs, both of Traunrent, Germany

[73] Assignee: Siemens-Electrogerate GmbH, Berlin and Munich, Germany

[22] Filed: Dec. 9, 1969

[21] Appl. No.: 883,457

[30] Foreign Application Priority Data

Dec. 11, 1968 Germany......................P 18 13 866.4

[52] U.S. Cl............................126/19 R, 126/273 R, 126/340
[51] Int. Cl.........................................A21b 1/00, F24c 15/16
[58] Field of Search....................126/19, 273, 332, 337, 339, 126/340

[56] References Cited

UNITED STATES PATENTS

| | | | |
|---|---|---|---|
| 1,948,118 | 2/1934 | Klemme | 126/340 |
| 2,133,639 | 10/1938 | Smith et al. | 126/340 |
| 2,290,572 | 7/1942 | Ray | 126/339 |
| 2,613,123 | 10/1952 | Patten | 126/340 UX |
| 2,879,763 | 3/1959 | Long | 126/337 UX |

Primary Examiner—Charles J. Myhre
Attorney—Curt M. Avery, Arthur E. Wilfond, Herbert L. Lerner and Daniel J. Tick

[57] ABSTRACT

A baking and roasting oven for cooking food and storing utensils has a muffle that defines an enclosure having an opening. A mounting is disposed beneath the muffle and a carriage is provided that movably engages the mounting. A door for closing the opening is mounted to the carriage at fixed angle. The carriage is constructed as a rigid frame and supports a bin for storing the utensils.

7 Claims, 3 Drawing Figures

PATENTED JAN 25 1972  3,636,937

BAKING AND ROASTING OVEN

Our invention relates to a baking and roasting stove which is preferably heated by electricity and has a muffle oven whose front side is closed by a door.

In order to facilitate the operation of a baking and roasting oven and to keep down the cost of energy as well as to provide a construction which can reliably withstand the high-mechanical stresses from the products being prepared in the baking and roasting oven, it is advantageous to attach the door at a fixed angle to a carriage guided below the muffle and to equip the door with an adjustable carrier for receiving the products to be cooked.

It is an object of our invention to provide a baking and roasting oven which permits the utensils not used during the cooking of the food to be accommodated in the stove. The invention thus overcomes the disadvantage where utensils such as cake plates must be stored outside the baking and roasting oven. According to a feature of the invention, the carriage is configured as a rigid frame equipped with a container or bin for storing oven utensils, such as baking tins, grills, frying pans, and the like.

This construction permits the stove to be fabricated in accordance with standard dimensions which are essentially dependent on the dimensions of the usually heat-insulated muffle.

In a preferred embodiment of the invention, the carriage bin is tightly connected with the frame. Hence, the bin contributes toward stabilizing the carriage supporting the door and so permits the frame to be produced, for example, with a weaker profile.

According to another feature of the invention, the carriage bin consists of a deep-drawn tub-shaped shell. It is also possible, however, to finish the walls of the carriage bin with a latticed web.

To protect the unused stove utensils located in the storage bin from becoming covered with dust, the bin is provided with a cover.

An alternate embodiment of the baking and roasting oven of the invention, provides at least one drainage opening in the bottom part of the muffle for draining condensed water. This embodiment becomes especially advantageous when the cover and/or the additional bin are inserted into the carriage as a catch bin for the liquid.

The invention will now be described with reference to the accompanying drawing, in which.

Figure 1:
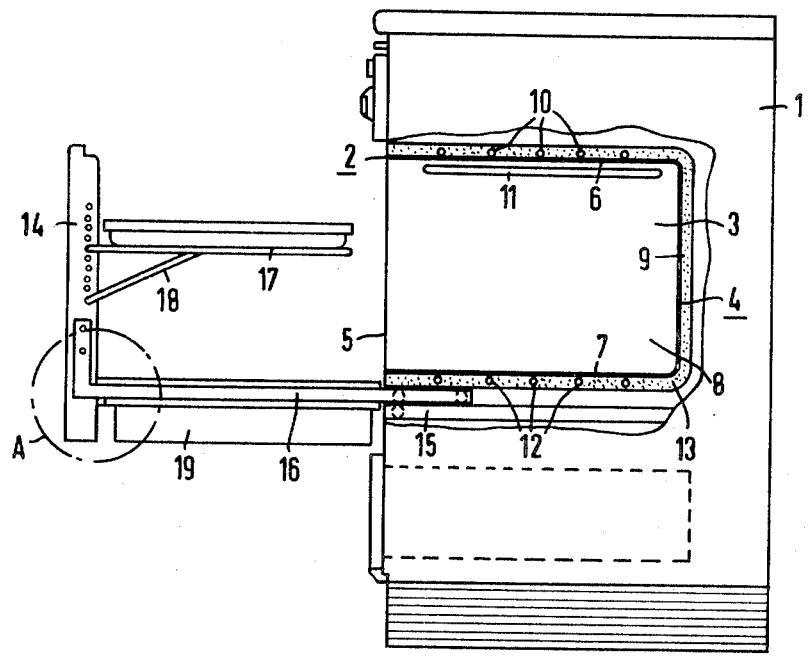
FIG. 1 is a broken out view, partially in section, of a baking and cooking oven according to the invention.

FIG. 1 schematically illustrates a baking and roasting oven 2 in a stove 1. The baking and roasting oven comprises a muffle 4 adjacent to the hollow space 3, the muffle being formed by a coverside 6, a bottom part 7, lateral walls 8 and a rear wall 9, and has a loading opening 5 on its front side. Within the region of the coverside 6 are situated the heating members 10, 11 for high heat and for grill radiant heat and the heating elements 12 for low heat are arranged in the area of the bottom side 7. The muffle 4 is provided on the outside with a heat-insulating layer 13.

The loading opening 5 can be closed by a door 14 on its front side. The door is attached at a fixed angle to a carriage guided by rollers below the muffle 4. The door 14 is equipped with an adjustable carrier 17 for receiving the foods to be cooked. If required, the carrier can be equipped with additional supports 18.

Figures 2, 3:
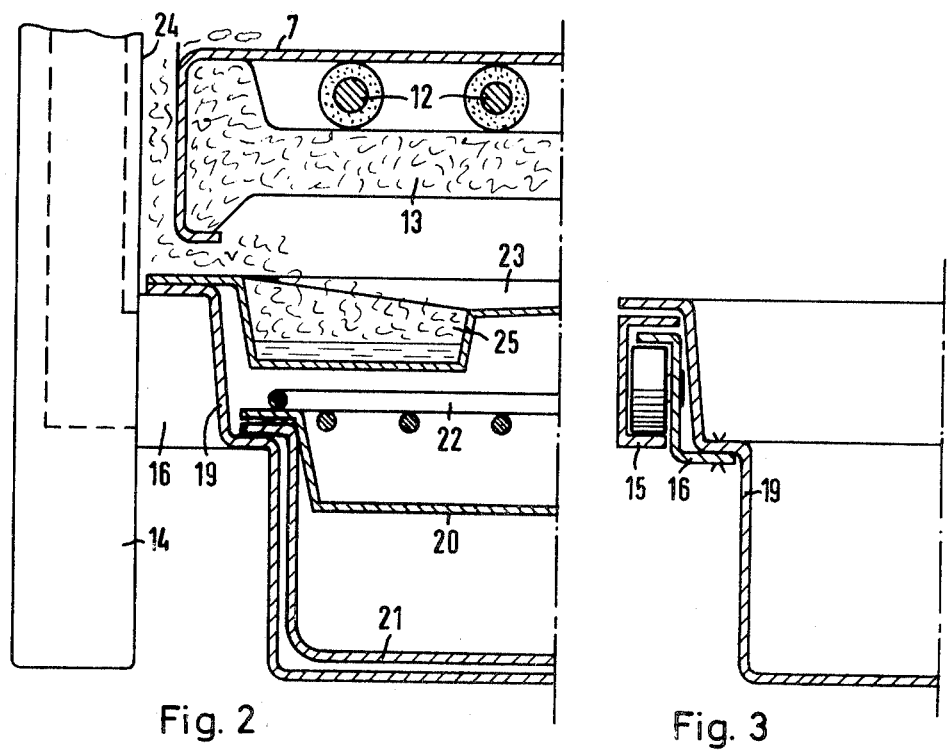
FIG. 2 is a schematic diagram of detail A of FIG. 1 with the door of the oven in the closed position.
FIG. 3 illustrates, in section, the connection of the bin and carriage arrangement of FIG. 2.

FIG. 2 illustrates detail A of FIG. 1 with the door 14 in a closed position through the front region of the baking and roasting oven 2. The carriage 16 is constructed as a rigid frame and supports a bin 19 made from sheet metal wherein are stored stove utensils such as baking tin 20, frying pan 21, and grill 22. As shown in FIG. 3, the bin can be firmly attached with the carriage 16. Also, in place of a deep-drawn tub-shaped bin 19, the walls of the carriage bin can also be produced as a lattice-type web in the manner of a basket. The top part of the bin 19 is provided with a cover 23.

To remove the stove utensils from the bin 19, the door 19, the door 14 with the self-supporting carriage 16 is pulled from the baking and roasting oven and the cover is removed or flipped open.

In the illustrated embodiment, the baking and roasting oven is provided with a gaplike drainage opening situated between the bottom side 7 of the muffle and the inside region of the door 24, through which the condensed water collected in the muffle is removed. The cover 23 has impressions 25 for the condensed water which function as a catch basin for the liquid.

If it is required, other suitable vessels can be placed into the carriage frame 16 as catch basins for the condensed water in lieu of the one illustrated.

To those skilled in the art it will be obvious upon a study of this disclosure that our invention permits of various modifications and may be given embodiments other than particularly illustrated herein, without departing from the essential features of the invention and within the scope of the claims annexed hereto.

We claim:

1. A baking and roasting oven for cooking food and storing utensils comprising a muffle structure defining a muffle enclosure having an opening, mounting means disposed beneath said muffle structure, carriage means movably engaging said mounting means, and a door for closing said opening mounted to said carriage means at a fixed angle, a carrier adjustably mounted to said door for carrying the food to be cooked into said muffle enclosure when said door is closed, a bin for storing the utensils, said carriage means comprising a rigid frame for movably supporting said bin beneath said muffle structure.

2. In an oven according to claim 1, said bin being rigidly connected to said frame.

3. In an oven according to claim 1, said bin having walls formed of a latticelike web.

4. In an oven according to claim 1, said bin being made of deep-drawn material and having a tublike shape.

5. An oven according to claim 1, said bin being provided with a cover.

6. A baking and roasting oven according to claim 1, wherein water condenses within said enclosure during cooking, said muffle having a bottom portion provided with openings through which the condensed water can drain, and said bin being equipped with receptacle means for collecting said water.

7. In an oven according to claim 6, said receptacle means being a cover having at least one impression for collecting said water.

* * * * *